United States Patent
Bowman et al.

[19]

[11] Patent Number: 5,976,221
[45] Date of Patent: *Nov. 2, 1999

[54] REMOVAL OF OIL FROM COMPRESSED GAS WITH MACROPOROUS POLYMERIC ADSORBENT

[75] Inventors: Reid Henry Bowman, Walnut Creek, Calif.; H. Robert Goltz, Midland, Mich.

[73] Assignee: MG Generon, Inc., Malvern, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/922,326

[22] Filed: Sep. 3, 1997

Related U.S. Application Data

[63] Continuation of application No. 08/566,374, Dec. 29, 1995, Pat. No. 5,700,310.

[51] Int. Cl.$^6$ ............................ B01D 53/22; B01D 53/04
[52] U.S. Cl. .................... 95/45; 95/54; 95/143; 95/287; 96/4; 96/8; 96/108
[58] Field of Search ..................... 95/45, 47–54, 95/143–147, 273, 287; 96/4, 7–10, 108

[56] References Cited

U.S. PATENT DOCUMENTS

| | | | |
|---|---|---|---|
| 3,686,827 | 8/1972 | Haigh et al. | 95/143 X |
| 3,727,379 | 4/1973 | Bijleveld et al. | 95/147 X |
| 3,798,876 | 3/1974 | Kennedy | 95/143 X |
| 4,239,508 | 12/1980 | Rock et al. | 95/147 |
| 4,324,565 | 4/1982 | Benkmann | 95/143 X |
| 4,560,394 | 12/1985 | McDonald et al. | 96/4 X |
| 4,602,477 | 7/1986 | Lucadamo | 96/4 X |
| 4,681,602 | 7/1987 | Glenn et al. | 95/47 |
| 4,732,583 | 3/1988 | DeLong et al. | 96/4 X |
| 4,863,494 | 9/1989 | Hayes | 95/146 X |
| 4,881,953 | 11/1989 | Prasad et al. | 95/54 X |
| 5,181,942 | 1/1993 | Jain | 95/45 |
| 5,281,257 | 1/1994 | Harris | 95/147 X |
| 5,288,307 | 2/1994 | Goltz et al. | 95/143 |
| 5,290,341 | 3/1994 | Barbe | 95/54 |
| 5,388,413 | 2/1995 | Major et al. | 95/54 X |
| 5,393,328 | 2/1995 | Barbe | 96/4 |
| 5,425,801 | 6/1995 | Prasad | 95/45 X |
| 5,429,662 | 7/1995 | Fillet | 95/45 X |
| 5,447,555 | 9/1995 | Yee et al. | 96/9 X |
| 5,470,379 | 11/1995 | Garrett | 95/54 X |

FOREIGN PATENT DOCUMENTS

| | | | |
|---|---|---|---|
| 0979823 | 12/1975 | Canada | 95/143 |
| 0409545 | 1/1991 | European Pat. Off. | 95/47 |
| 0588705 | 3/1994 | European Pat. Off. | 95/47 |
| 62-191020 | 8/1987 | Japan | 95/143 |
| 62-289217 | 12/1987 | Japan | 95/143 |
| 0827132 | 5/1981 | U.S.S.R. | 95/143 |
| 0860832 | 9/1981 | U.S.S.R. | 95/143 |

*Primary Examiner*—Robert Spitzer
*Attorney, Agent, or Firm*—William H. Eilberg

[57] ABSTRACT

A macroporous polymeric adsorbent is used to remove oil mist and oil vapors from compressed air produced by an oil-lubricated air compressor prior to feeding the compressed air to an air separation membrane system. The macroporous polymeric adsorbent, previously known only for its ability to extract low molecular weight volatile organic compounds from liquids and gases, retains its ability to extract the oil for extended periods of time and outperforms the commonly used activated carbon of the prior art.

19 Claims, 1 Drawing Sheet

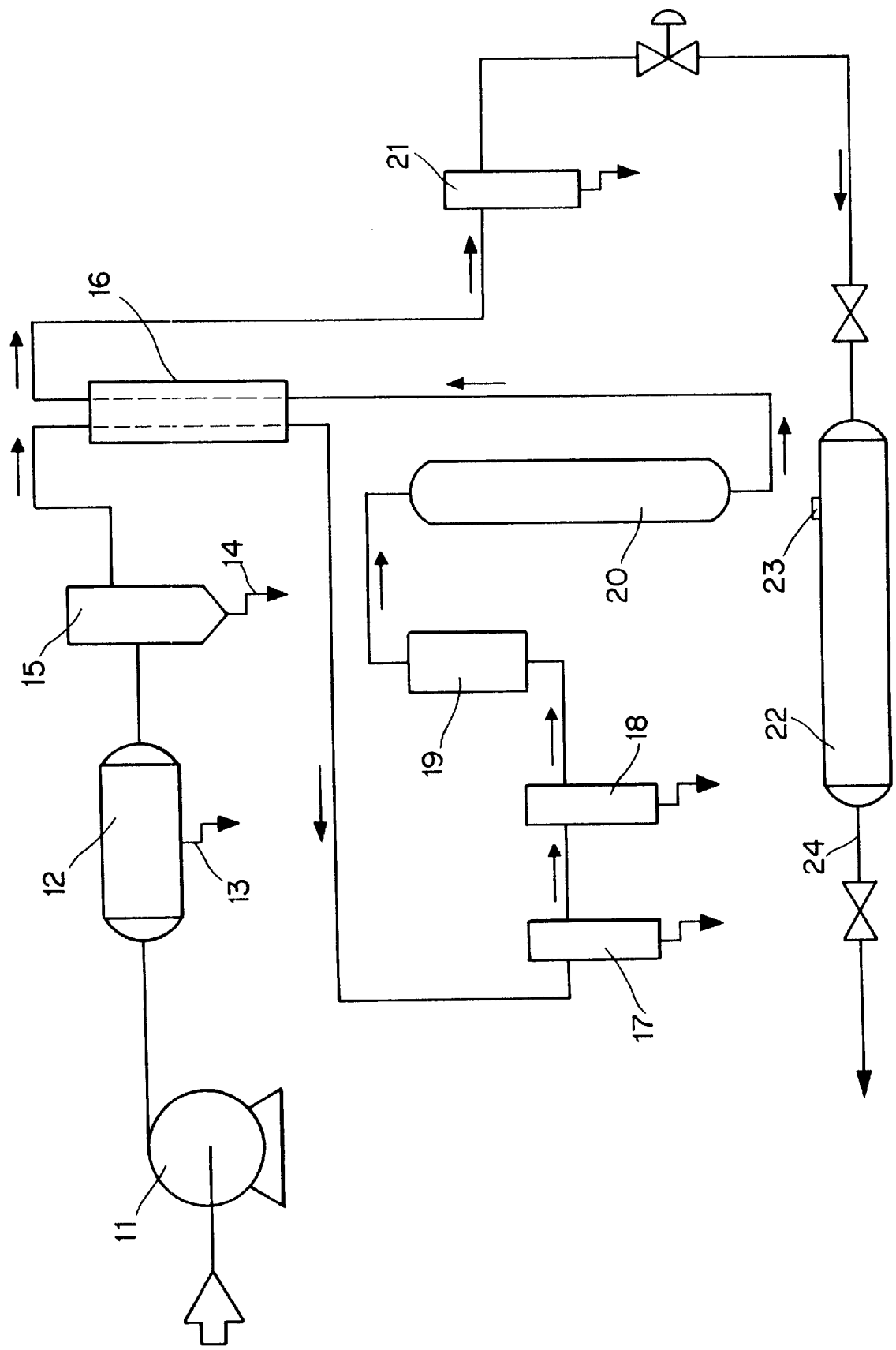

REMOVAL OF OIL FROM COMPRESSED GAS WITH MACROPOROUS POLYMERIC ADSORBENT

This is a continuation of application Ser. No. 08/566,374, filed Dec. 29, 1995 now U.S. Pat. No. 5,700,310.

BACKGROUND OF THE INVENTION

Membranes for the separation of gas mixtures by selective permeability are well known and have been in commercial use for a considerable period of time. These membranes are commonly sold as modules designed to present a large membrane surface area to the flowing gas. The modules are used on-site by plants or operations where a gas stream rich in a particular gaseous component is needed and where the available on-site source is a mixture of gases containing the desired component in insufficient concentration. Examples of the types of separations that can be performed by these membranes are nitrogen and oxygen from air; helium from a mixture of helium and nitrogen; hydrogen and carbon dioxide from a hydrogen/carbon dioxide mixture; hydrogen and methane from natural gas; carbon dioxide and methane from natural gas and similar mixtures; and argon from mixtures of argon and nitrogen.

The membranes have been used in a variety of configurations and dimensions, the most prominent of which are hollow fibers and sheets. Hollow fiber membranes are comparable in diameter to the human hair. Modules of these fibers contain several hundred thousand or more such fibers arranged in bundles for parallel flow, the modules containing passages to direct the flow of incoming gas through the membranes and to collect the permeate and remainder streams from separate outlets. In modules designed for boreside feed, the incoming gas is directed to the fiber lumens, whereas in modules designed for shellside feed, the incoming gas is directed to the fiber exteriors, the permeate being drawn from the shellside or boreside, respectively. In the typical module of a sheet-form membrane, the membrane is wound in a spiral wrap around a central pipe, the spiral further containing one or more spacer sheets interleaved with the membrane sheet. The incoming gas is fed to the spiral either from its outside surface to permeate inward or from the central pipe to permeate outward, with the permeate in either case flowing radially through the spiral and either the permeate, the remainder, or both being collected accordingly.

Forcing the incoming gas across these membranes requires a pressure differential which is typically from about 2 (13.8 kPa) to about 10 pounds per square inch (69 kPa). The inlet pressure will be selected to meet this differential while achieving the desired delivery pressures (the pressures of the permeate and the remainder leaving the module), which will generally range from about 25 psia (75 kPag, 175 kPa) to about 190 psia (1210 kpag, 1310 kPa). Inlet pressures will most often range from about 60 psia (314 kPag, 414 kPa) to about 200 psia (1,280 kPag, 1,380 kPa). The abbreviation "psia" denotes pounds per square inch absolute, "kPa" denotes kilopascals, and "kPag" denotes kilopascals gauge (i.e., kilopascals in excess of atmospheric pressure).

The inlet pressure is frequently raised to these levels by compressors, which can introduce lubricating oils in both liquid and vapor form into the gas stream, contaminating the membrane and lower its separation efficiency. To avoid interfering with the membrane operation, the oil content must be reduced to the parts per billion range before the air stream reaches the membrane system. Much of the liquid oil can be removed by relatively coarse units such as coalescing filters, which lower the liquid oil content from an initial 5 to 10 ppm to 1 ppm or less (all such concentrations are on a weight basis). Further reduction of the liquid oil and oil vapor is presently achieved by the use of granular activated carbon, which can lower the oil content to less than 10 ppb.

Many gas mixtures however, particularly compressed air, have a high relative humidity, which is incompatible with activated carbon since the carbon loses its adsorption capability at relative humidities exceeding 50%. Using air as an example, one presently used method of lowering the humidity, after the bulk of the moisture is removed in the compressor unit itself, is to pass the compressed air through a refrigerated dryer and a heater before the air reaches the coalescing filters. The dryer condenses out more water by cooling the air to about 2° C., and the heater returns the air to room temperature so that the resulting air has a relative humidity of about 30%. The refrigerated dryer and heater are cumbersome units that are expensive to run and to maintain, and despite their use, the activated carbon still requires frequent replacement or regeneration. In addition, activated carbon creates dust which can add to the impurities of the air stream and can present an environmental hazard by causing the release of particulate matter into the atmosphere.

For air as well as gas mixtures in general, both cost efficiency and continuity of operation would be improved with a system which did not require lowering the humidity below 50%, which did not require frequent regeneration of the adsorbent, and which can easily be handled without presenting an environmental hazard due to the risk of discharging particulate matter into the atmosphere. These and other goals are met by the present invention.

SUMMARY OF THE INVENTION

It has now been discovered that the level of lubricating oil in a compressed gas from a gas compressor can be reduced to a range which is not detrimental to a gas separation membrane system by passing the compressed gas through a macroporous polymeric adsorbent of the type previously used for adsorption of low molecular weight volatile organic compounds from gas and liquid streams. The adsorbent retains its sorption capacity at humidities as high as 90%, and maintains its sorption capacity at a functional level for periods of time at least several times longer than activated carbon. The adsorbent further has high crush resistance and is available in forms susceptible to easy handling with little or no risk of dust formation.

In the system described in the "Background" section of this specification, replacement of the activated carbon bed with the macroporous polymeric adsorbent eliminates the need to achieve a low relative humidity and hence the need for the refrigerated dryer and heater. Compressed gas upon leaving the condensate separator in the compressor can be heated by as little as 5° C. to 10° C., then sent directly to the coalescing filters. In a preferred procedure, the gas emerging from the coalescing filters is heated again by a small increment, then passed through the macroporous polymeric adsorbent. The gas leaving the adsorbent is used to heat the gas entering the coalescing filters in a cross heat exchanger. The adsorbent is similarly effective in other flow schemes.

In general, however, this invention lies in the discovery that macroporous polymeric adsorbents previously known only for their ability to extract volatile organic compounds of low molecular weight from gases or liquids are in fact capable of extracting oils of higher molecular weight such as lubricating oils, and can do so for an extended period of time without losing their sorption capacity. These and other features, embodiments and advantages of the invention will become apparent from the description in the succeeding sections of this specification.

BRIEF DESCRIPTION OF THE DRAWING

The drawing attached to this specification depicts one example of a flow scheme for an air separation process embodying this invention.

DETAILED DESCRIPTION OF THE INVENTION AND PREFERRED EMBODIMENTS

The mechanism at the molecular level by which the macroporous polymeric adsorbent extracts the oil from the gas stream, i.e., whether the mechanism is technically adsorption, absorption, or both, is not precisely known. The dominating mechanism at least is believed to be adsorption. Accordingly, the terms "adsorption" and "adsorbent" are used throughout this specification, although this is done primarily for convenience. The invention is not considered to be limited to any particular mechanism.

The term "macroporous" is used in the art interchangeably with "macroreticular," and refers in general to porous polymers having regions of densely packed polymer chains separated by void spaces that constitute the macropores. The macropores generally have diameters of about 100 Å or greater. Pores of considerably smaller size, frequently referred to as "micropores," exist in the regions of the packed polymer chains. The separation giving rise to the micropores can be achieved in various ways, including forming the polymer in the presence of an inert diluent or other porogen to cause phase separation.

Examples of monomers that can be polymerized to form macroporous polymeric adsorbents useful are styrene, alkylstyrenes, halostyrenes, haloalkylstyrenes, vinylphenols, vinylbenzyl alcohols, vinylbenzyl halides, and vinylnaphthalenes. Included among the substituted styrenes are ortho-, meta-, and para-substituted compounds. Specific examples are styrene, vinyltoluene, ethylstyrene, t-butylstyrene, and vinyl benzyl chloride, including ortho-, meta-, and para-isomers of any such monomer whose molecular structure permits this type of isomerization. Further examples of monomers are polyfunctional compounds. One preferred class is polyvinylidene compounds, examples of which are divinylbenzene, trivinylbenzene, ethylene glycol dimethacrylate, divinylsulfide and divinylpyridine. Preferred polyvinylidene compounds are di- and trivinyl aromatic compounds. Polyfunctional compounds can also be used as crosslinkers for the monomers of the first group.

One preferred method of preparing the polymeric adsorbent is by swelling the polymer with a swelling agent, then crosslinking the polymer in the swollen state, either as the sole crosslinking reaction or as in addition to crosslinking performed prior to swelling. When a swelling agent is used, any pre-swelling crosslinking reaction will be performed with sufficient crosslinker to cause the polymer to swell when contacted with the swelling agent rather than to dissolve in the agent. The degree of crosslinking, regardless of the stage at which it is performed, will also affect the porosity of the polymer, and can be varied to achieve a particular porosity. Given these variations, the proportion of crosslinker can vary widely, and the invention is not restricted to particular ranges. Accordingly, the crosslinker can range from about 0.25% of the polymer to about 45%. Best results are generally obtained with about 0.75% to about 5% crosslinker relative to the polymer, the remaining (noncrosslinking) monomer constituting from about 95% to about 99.25% (all percentages are by weight).

Other macroporous polymeric adsorbents useful in the practice of this invention are copolymers of one or more monoaromatic monomers with one or more nonaromatic monovinylidene monomers. Examples of the latter are methyl acrylate, methyl methacrylate and methylethyl acrylate. When present, these nonaromatic monomers preferably constitute less than about 30% by weight of the copolymer.

The macroporous polymeric adsorbent is prepared by conventional techniques, examples of which are disclosed in various United States patents. Examples are Meitzner et al., U.S. Pat. No. 4,297,220; Meitzner et al., U.S. Pat. No. 4,382,124; Harris et al., U.S. Pat. No. 4,564,644; Schneider et al., U.S. Pat. No. 5,079,274; Goltz et al., U.S. Pat. No. 5,288,307; Stringfield et al., U.S. Pat. No. 4,950,332; and Norman et al., U.S. Pat. No. 4,965,083. The disclosures of each of these patents are incorporated herein by reference for all legal purposes to be served thereby.

For polymers that are swollen and then crosslinked in the swollen state, the crosslinking subsequent to swelling can be achieved in a variety of ways, which are further disclosed in the patents cited above. One method is to first haloalkylate the polymer, then swell it and crosslink by reacting the haloalkyl moieties with aromatic groups on neighboring chains to form an alkyl bridge. Haloalkylation is achieved by conventional means, an example of which is to first swell the polymer under non-reactive conditions with the haloalkylating agent while including a Friedel-Crafts catalyst dissolved in the haloalkylating agent. Once the polymer is swollen, the temperature is raised to a reactive level and maintained until the desired degree of haloalkylation has occurred. Examples of haloalkylating agents are chloromethyl methyl ether, bromomethyl methyl ether, and a mixture of formaldehyde and hydrochloric acid. After haloalkylation, the polymer is swelled further by contact with an inert swelling agent. Examples are dichloroethane, chlorobenzene, dichlorobenzene, ethylene dichloride, methylene chloride, propylene dichloride, and nitrobenzene. A Friedel-Crafts catalyst can be dissolved in the swelling agent as well, since the catalyst will be used in the subsequent crosslinking reaction. The temperature is then raised to a level ranging from about 60° C. to about 85° C. in the presence of the catalyst, and the bridging reaction proceeds. Once the bridging reaction is complete, the swelling agent is removed by solve nit extraction, washing, drying, or a combination of these procedures.

The pore, size distribution and related properties of the finished adsorbent can vary widely, and no particular ranges are critical to the invention. In most applications, best results will be obtained at a porosity (total pore volume) within the range of from about 0.5 to about 1.5 cc/g of the polymer. A preferred range is about 0.7 to about 1.3 cc/g. Within these ranges, the amount contributed by macropores (i.e., pores having diameters of 100 Å or greater) will preferably range from about 0.025 to about 0.6 cc/g, and most preferably from about 0.04 to about 0.5 cc/g. The surface area of the polymer, as measured by nitrogen adsorption methods such as the well-known BET method, will in most applications be within the range of about 150 to about 2100 $m^2/g$, and preferably from about 400 to about 1400 $m^2/g$. Thie average pore diameter will most often range from about 10 Å to about 100 Å.

The form of the macroporous polymeric adsorbent is likewise not critical and can be any form which is capable of containment and contact with a flowing compressed air stream. Granular particles and beads are preferred, ranging in size from about 50 to about 5,000 microns, with a range of about 500 to about 3,000 microns particularly preferred. Contact with the adsorbent can be achieved by conventional flow configurations of the gas, such as those typically used in fluidized beds or packed beds. The adsorbent can also be enclosed in a cartridge for easy removal and replacement and a more controlled gas flow path such as radial flow.

The macroporous polymeric adsorbent can function effectively under a wide range of operating conditions. The temperature will preferably be within any range which does not cause further condensation of vapors or any change in physical or chemical form of the adsorbent. Preferred operating temperatures are within the range of from about 5° C. to about 75° C., and most preferably from about 10° C. to about 50° C. In general, operation at ambient temperature or between ambient temperature and 10 to 15° C. above ambient will provide satisfactory results. The pressure of the compressed air entering the adsorbent bed can vary widely as well, preferably extending from about 2 psig (115 kPa) to about 1000 psig (7000 kPa). The pressure will generally be dictated by the needs of the membrane system and of the plant unit where the product gas will be used. A typical pressure range is from about 100 psig (795 kPa) to about 300 psig (2170 kPa). The residence time of the compressed gas in the adsorbent bed will most often range from about 0.01 second to about 5 seconds, and preferably from about 0.3 second to about 3.0 seconds. The space velocity of the compressed gas through the bed will most often fall within the range of about 0.1 foot per second to about 5 feet per second, with a range of about 0.3 foot per second to about 3 feet per second preferred. Finally, the relative humidity can have any value up to 100%, although for convenience, the preferred range of relative humidity is about 25% to about 90%.

Liquid oil and oil vapor removable from compressed gases in accordance with this invention include both mineral oil-derived and petroleum-derived lubricating oils, and generally have widely varying molecular weights, viscosities and droplet sizes. Oils of particular interest in connection with this invention are those having molecular weights of about 300 or above, preferably from about 300 to about 2500, and most preferably from about 350 to about 700. Compression of the gas can be achieved by using conventional compressors. Examples are centrifugal compressors, rotary screw compressors, reciprocating piston compressors, and diaphragm compressors.

The gas stream leaving the macroporous polymeric adsorbent is described herein as "substantially oil-free." This term means having an oil content low enough to avoid having a detrimental effect on the separation capability of the membrane to which the gas stream is fed. While there is no exact figure or range, in most cases membrane fouling will be avoided at oil contents of about 100 ppb or less, preferably about 50 ppb or less, and most preferably about 10 ppb or less.

In the preferred practice of this invention, much of the oil in the compressed gas is removed upstream of the macroporous polymeric adsorbent, leaving the adsorbent bed to remove oil mists entering at levels of approximately 1 ppm or less as well as oil vapor. Prominent among the various types of filters for lowering the oil content to this level are coalescing filters which are available from various suppliers such as, for example, Zander Filter Systems Inc., Norcross, Ga., USA; Wilkerson Corp., Englewood, Colo., USA; Pall Process Filtration Co., East Hills, N.Y., USA; and Domnick Hunter Inc., Charlotte, N.C., USA.

Membranes and membrane systems to be protected by the macroporous adsorbents in accordance with this invention are well known and widely varied. Examples of the various polymers from which these membranes are made are polyimides, copolyi mldes, polyanides, polyarylates, poly4-methyl-1-pentene, polytrimethylsilylpropyne, asymmetric aromatic polysulfones, sulfonated polysulfones, bis A-polysulfones, polyether-sulfones, fluorinated polyethersulfones, polyethylene terephthalate, polycyanoarylethers, and bisphenol polycarbonates, as well as some of these polymers supplemented with coatings and additives. Descriptions of some of these polymers and the membranes formed from them are found in the following patents, listed by assignee:

Air Products and Chemicals, Inc., Allentown, Pa., USA:
 Rao, et al., U.S. Pat. No. 5,104,425 (Apr. 14. 1992); Anand, et al., U.S. Pat. No. 5,073,175 (Dec. 17, 1991), Burgoyne, Jr., et al., U.S. Pat. No. 5,061,298 (Oct. 29, 1991); Meier, et al., U.S. Pat. No. 5,045,093 (Sep. 3, 1991); Sorensen, U.S. Pat. No. 5,043,067 (Aug. 27, 1991); Meier, et al., U.S. Pat. No. 5,042,993 (Aug. 27, 1991); Tien, et al., U.S. Pat. No. 5,034,027 (Jul. 23, 1991); Anand, et al., U.S. Pat. No. 5,013,338 (May 7, 1991); Sumamer, et al., U.S. Pat. No. 5,013,332 (May 7, 1991); Angus, et al., U.S. Pat. No. 5,009,679 (Apr. 23, 1991); Tien, et al., U.S. Pat. No. 5,007,945 (Apr. 16, 1991); DiMartino, Sr., et al., U.S. Pat. No. 5,006,132 (Apr. 9, 1991);

Permea, Inc., St. Louis, Mo., USA:
 Rice, et aL, U.S. Pat. No. 5,030,251 (Jul. 9, 1991); Malon, et al., U.S. Pat. No. 5,013,767 (May 7, 1991); Malon, et al., U.S. Pat. No. 4,992,221 (Feb. 12, 1991);

Union Carbide Industrial Gases Technology Corporation, Danbury, Conn., USA:
 Prasad, et al., U.S. Pat. No. 5,122,355 (Jun. 16, 1992); Prasad, et al., U.S. Pat. No. 5,102,432 (Apr. 7, 1992); Prasad, et al., U.S. Pat. No. 5,084,073 (Jan. 28, 1992); Schaub, U.S. Pat. No. 5,077,029 (Dec. 31, 1991); Bikson, et al., U.S. Pat. No. 5,071,448 (Dec. 10, 1991); Bikson, et al., U.S. Pat. No. 5,067,971 (Nov. 26, 1991); Kawakami, et al., U.S. Pat. No. 5,055,114 (Oct. 8, 1991); Handley, U.S. Pat. No. 5,041,149 (Aug. 20, 1991); Bikson, et al., U.S. Pat. No. 5,026,479 (Jun. 25, 1991); Haas, et al., U.S. Pat. No. 5,004,482 (Apr. 2, 1991); Kawakami, et al., U.S. Pat. No. 4,994,095 (Feb. 19, 1991);

E.I. duPont de Nemours & Company, Wilmington, Del., USA:
 Ekiner, et al., U.S. Pat. No. 5,085,676 (Feb. 4, 1992); Feiring, et al., U.S. Pat. No. 5,084,548 (Jan. 28, 1992); Kritzan, U.S. Pat. No. 5,080,698 (Jan. 14, 1992); Hayes, U.S. Pat. No. 5,076,817 (Dec. 31, 1991); Arthur, U.S. Pat. No. 5,073,176 (Dec. 17, 1991);

Ube Industries, Ltd., Yamaguchi, Japan:
 Makino, et al., U.S. Pat. No. 4,474,858 (Oct. 2, 1984); Makino, et al., U.S. Pat. No. 4,460,526 (Jul. 17, 1984); Makino, et al., U.S. Pat. No. 4,378,400 (Mar.29, 1983); Makino, et al., U.S. Pat. No. 5 4,370,290 (Jan. 25, 1983);

The Dow Chemical Company, Midland, Mich., USA:
 Mahon, U.S. Pat. No. 3,228,876 (Jan. 11, 1966); Mahon, U.S. Pat. No. 3,228,877 (Jan. 11, 1966); McLain, U.S. Pat. No. 3,422,008 (Jan. 14, 1969); Caskey, et al., U.S. Pat. No. 4,929,259 (May 29, 1990); Caskey, et al., U.S. Pat. No. 4,961,760 (Oct. 9, 1990); Edwards, et al., U.S. Pat. No. 5,013,331 (May 7, 1991); Trimmer, et al., U.S.

Pat. No. 5,013,437 (May 7, 1991); Trimmer, U.S. Pat. No. 5,211,728 (May 18, 1993).

The relevant portions of each of these patents are incorporated herein by reference for all legal purposes which may be served thereby.

This invention is applicable to the use of membranes for gas mixture separations in general. As indicated above, examples of gas separations covered by this invention are the extraction of nitrogen-rich and/or oxygen-rich streams from air; the extraction of an enriched helium stream from a mixture of helium and nitrogen; the extraction of hydrogenrich and/or carbon dioxide-rich streams from hydrogen/carbon dioxide mixtures or other gas mixtures that include these components; the extraction of hydrogen-rich, carbon dioxide-rich, andlor methane-rich streams from natural gas or similar mixtures; and the extraction of an argon-rich stream from a mixture of argon and nitrogen or from other mixtures containing argon. Membrane materials suitable for each of these separations are disclosed in the patents listed above, and will be readily apparent to those skilled in the art of gas separation membrane technology.

One application of interest for the practice of this invention is the extraction of nitrogen-rich andlor oxygen-rich streams from air. Preferred membrane materials for this type of separation are bisphenol polycarbonates, particularly those represented by the following formula

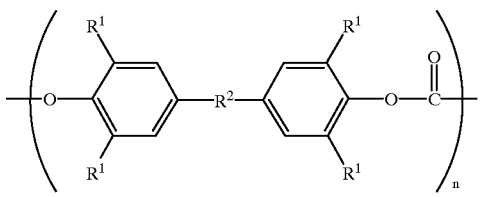

In this formula, the $R^1$ groups are either the same or different within any single bisphenol subunit (the bracketed portion of the fonnula) and similarly either the same or different among different bisphenol subunits in a single polymerpo chain or among different polymeric chains. Likewise, the $R^2$ units are either the same or different among different bisphenol subunits in a single polymeric chain or among different polymeric chains. The $R^1$ groups are defined as H, Cl, Br, or $C_1$–$C_4$ alkyl. The $R^2$ groups are defined as carbonyl (—C(O)—), thio (—S—), sulfonyl (—$SO_2$—), oxy (—O—), a $C_1$–$C_6$ divalent hydrocarbon radical, a $C_1$–$C_6$ divalent halo-substituted hydrocarbon radical, or an inertly substituted $C_1$–$C_6$ divalent hydrocarbon radical. Within these definitions, "halo-substituted" is preferably fluoro-, chloro- or bromo-substituted, and "inertly substituted" is preferably ($C_1$–$C_3$ alkoxy)-substituted, ($C_1$–$C_3$ alkylthio)-substituted, or hydroxy-substituted. The index n is a positive integer such that the polymer has sufficient molecular weight to prepare a membrane with suitable characteristics as a gas separation membrane. The polymer most often has a number average molecular weight of about 50,000 or greater, and most preferably from about 100,000 to about 300,000. In terms of the value of n, preferred polymers are those in which n has a number average of 50 or greater, and most preferably 100 to 1,000.

In most of these membranes, at least 25 weight percent of the bisphenol subunits in the polymer are those whose $R^1$ groups are exclusively Br, Cl or mixtures of Br and Cl. More preferred are those in which at least 35%, and preferably at least 75% by weight, of the bisphenol subunits have $R^1$ groups that are exclusively Br, Cl or mixtures of Br and Cl. Particularly preferred are those in which the $R^1$ groups are all either Br, Cl, or mixtures of the two. Polymers in which the $R^1$ groups are either all Cl or all Br in substantially all of the bisphenol subunits, such as those prepared from tetrachlorobisphenols or tetrabromobisphenols, are even more preferred. Polymers prepared from tetrabromobisphenols are the most preferred. When $R^1$ groups which are not halogens are included, preferred such groups are H and methyl.

Preferred groups for $R^2$ are $C_1$–$C_6$ divalent hydrocarbon radicals, particularly $C_1$–$C_6$ alkylidene (saturated hydrocarbon) radicals, with isopropylidene (—$C(CH_3)_2$—) the most preferred.

Preferred bisphenol subunits within the formula are those prepared from 2,2bis(3,5-bromo-4-hydroxyphenyl)propane or 2, 2-bis(3,5-chloro-4-hydroxyphenyl)propane. Of these, 2,2-bis(3,5-bromo-4-hydroxphenyl)propane is the most preferred.

The preparation of bisphenol polycarbonates is known in the polymer industry. Any of several conventional processes may be used.

One method of preparation is the direct reaction method in which phosgene is reacted with a bisphenol appropriately substituted with the substituents of the desired polymer product to produce the polymer in solution. The reaction can be conducted in solution with a polymer solvent such as methylene chloride and an acid acceptor such as pyridine. The polymer is then recovered as an organic solution after multiple aqueous washes to remove excess acid acceptor and the reaction by-product which is the hydrochloride of the acid acceptor. A modified version of this method is one in which the bisphenol and 1–3 mole percent of the corresponding monofunctional phenol are dissolved or slurried in aqueous sodium hydroxide. The polymer solvent is then added, together with a catalytic quantity of a tertiary amine, and the resulting mixture is rapidly stirred while phosgene gas is added. Upon completion of the reaction, the phases are separated and the polymer solution is washed with water and extracted with acid to remove the catalyst.

Another method is transesterification. According to this method, phosgene is reacted with an appropriately substituted phenol to produce the corresponding diphenyl carbonate by passing the phosgene through an aqueous caustic solution of the phenol or by using a two-phase reaction medium as in the modified version of the direct reaction method. In either case, the crude diphenyl carbonate is purified by extraction with dilute base to hydrolyze and remove residual phenyl chloroformates, followed by distillation. Polymerization is then performed by combining the diphenyl carbonate with an appropriately substituted bisphenol in the presence of a basic catalyst such as calcium acetate or sodium, potassium or lithium carbonate under appropriate polymerization conditions.

Polymer resulting from either of these manufacturing methods is formed into membranes by methods known to those skilled in the art. Typically, the polymer is combined with a liquid solvent and a liquid non-solvent to form a mixture, which is then heated to form a homogeneous extrudable fluid. The fluid is then extruded into the configuration desired for the membrane, and passed through a quench zone in which the membrane is contacted with a liquid having a very low solubility for the polymer, to remove most of the solvent and non-solvent. Liquids useful as solvents include glycol ethers, dialkyl ketones, substituted morpholines, pyrrolidinones and substituted benzenes.

A particularly preferred solvent is N-methylpyrrolidone. The non-solvent is a liquid which does not dissolve the polymer to any significant degree at extrusion temperatures and which thereby aids in the formation of the pores in the finished polymer. Liquids useful as non-solvents include glycols and glycol ethers, esters, alkanols, cyclohexanes, alkanes, dialkyl ketones, amides, nitrites and aldehydes. Particularly preferred non-solvents are triethylene glycol and polyethylene glycols with molecular weights up to about 400. The spin composition (extrusion mixture) generally contains from about 30% to about 60% by weight of the polymer, and preferably from about 50% to about 55% by weight. The weight ratio of solvent to nonsolvent is preferably between about 2.0 and about 2.4. Methylene chloride is frequently included as a further solubilizing agent.

While the membrane can assume any of a wide variety of configurations, including flat sheets, hollow tubes and hollow fibers, the most preferred configurations are sheets and hollow fibers. Preferred membrane materials for spiral-rolled sheets are asymmetric aromatic polysulfones, sulfonated polysulfones, bis A-polysulfones, polyethersulfones, fluorinated polyether-sulfones. Preferred membrane materials for fibers are bisphenol polycarbonates.

The fiber shape is imparted to the membrane in the extrusion stage as indicated above. During the quench stage, the fiber is prevented from collapsing by passing a core fluid through the hollow core of the fiber. The quench stage consists of an air quench zone followed by a liquid quench zone, the core fluid being applied in the air quench zone. The core fluid is generally a gas such as air, nitrogen or argon, and is applied at a pressure of about 0.1 to about 0.5 inches of water. The liquid quench zone uses a low-solubility liquid, preferably water. The membrane may be dried by exposure to flowing air or an inert gas at a temperature between about 20° C. and about 80° C.

Preferred hollow fibers for use in this invention are those having an outside diameter of from about 50 microns to about 400 microns, more preferably from about 75 microns to about 250 microns. The outer-to-inner diameter ratio is preferably between about 1.15 and about 2.5, more preferably between about 1.25 and about 1.70. The separation factor (also referred to as "alpha") for oxygen and nitrogen at 30° C. is preferably about 3.0 or greater, most preferably about 5.0 or greater, with about 7.0 particularly preferred. The separation factor is defined as the ratio of the permeability or flux of the faster permeating gas (oxygen) to the permeability or flux of the slower permeating gas (nitrogen). The gas permeability for oxygen is preferably at least about 0.5 Barrers, most preferably at least about 4.0 Barrers. Preferred membranes also have a flux of about $3.0 \times 10^{-6}$ sec/cm$^2$-(cm Hg)-sec or greater, more preferably about $8.0 \times 10^{-6}$ sec/cm$^2$-(cm Hg)-sec or greater, still more preferably at least about $10.0 \times 10^{-6}$ sec/cm$^2$-(cm Hg)-sec or greater, still more preferably it least about $15.0 \times 10^{-6}$ sec/cm$^2$-(cm Hg)-sec or greater, and most preferably within the range of about $15.0 \times 10^{-6}$ to about $100.0 \times 10^{-6}$ sec/cm$^2$-(cm Hg)-sec.

Hollow fibers suitable for use in the present invention and the polymers from which they are made are disclosed in Sanders, Jr., et al., U.S. Pat. No. 4,772,392 (Sep. 20, 1988); Anand, et al., U.S. Pat. No. 4,818,254 (Apr. 4, 1989); Anand, et al., U.S. Pat. No. 4,840,646 (Jun. 20, 1989); Jeanes, U.S. Pat. No. 4,851,014 (Jul. 25, 1989); Jeanes, U.S. Pat. No. 4,874,401 (Oct. 17, 1989); Sanders, el al., U.S. Pat. No. 4,955,993 (Sep. 11, 1990); and Trimmer, U.S. Pat. No. 5,211,728 (May 18, 1993). The relevant portions of each of these patents are incorporated herein by reference for all legal purposes which may be served thereby.

Hollow fibers of the type described above are generally used in modules in which the fibers are arranged in a bundle encased in a vessel which directs an incoming air stream either through or around the fiber lumens and separates the oxygen-rich permeate passing through the fiber walls from the oxygen-depleted remainder stream in separate exit ports. Modules directing incoming air into the fiber lumens are referred to as boreside feed modules, while those directing incoming air to the exterior of the fibers are referred to as shellside feed modules.

In either case, the modules are preferably used with inlet pressures ranging from about 40 psia (276 kPa) to about 1000 psia (6900 kPa), more preferably from about 60 psia (413 kPa) to about 200 psia (1252 kPa). The pressure differential across the fiber membranes will vary with the membrane density and with the inlet pressure, but will preferably be between about 0.5 psia (3.5 kPa) and about 20 psia (138 kPa), and more preferably between about 2 psia (13.8 kPa) and about 10 psia (69 kPa). The total active surface area of the fibers in the bundle will range from about 30 to about 3000 square meters, preferably from about 100 to about 1000 square meters.

Modules suitable for use in the present invention are disclosed in Mahon, U.S. Pat. No. 3,228,876 (Jan. 11, 1966); Mahon, U.S. Pat. No. 3,228,877 (Jan. 11, 1966); McLain, U.S. Pat. No. 3,422,008 (Jan. 14, 1969); Caskey, et al, U.S. Pat. No. 4,929,259 (May 29, 1990); Caskey, et al., U.S. Pat. No. 4,961,760 (Oct. 9, 1990); Edwards, et al., U.S. Pat. No. 5,013,331 (May 7, 1991); Trimmer, et al., U.S. Pat. No. 5,013,437 (May 7, 1991); and Trimmer, U.S. Pat. No. 5,211,728 (May 18, 1993). The relevant portions of each of these patents are incorporated herein by reference for all legal purposes which may be served thereby.

The Figure attached to this specification shows one example of a flow scheme for an operation producing nitrogen-rich gas from air in accordance with this invention. An air compressor 11 draws atmospheric air and feeds it at elevated pressure to an air receiver tank 12 from which condensate 13 is drawn off. Further moisture 14 is removed by a moisture separator 15, from which the emerging compressed air is at about 28° C. and about 100% relative humidity. The emerging air passes through a plate-and-frame-type cross heat exchanger 16 where it is heated slightly by warmer air from downstream. The heated air is then passed through a pair of coalescing filters arranged in series, the first being a coarse coalescing filter 17 and the second a fine coalescing filter 18. Air emerging from the latter is heated 19, raising the temperature to about 35–40° C., then passed through a packed bed of macroporous polymeric adsorbent particles 20. Oil-free air (less than 1 ppb of oil) emerging from the packed bed 20 is returned to the cross heat exchanger 16 where it serves to heat the air emerging from the moisture separator 15. Upon leaving the cross heat exchanger 16, the oil-free air passes through a particle filter 21, and from there to a module 22 of hollow fiber membranes. The module contains a side port 23 from which oxygen-rich permeate emerges, while the nitrogen-rich remainder 24 leaves as a separate stream.

The following examples are offered as illustration only.

EXAMPLES

An apparatus was assembled by which compressed air at approximately 20–25° C., approximately 150 psig (1,136 kPa) (range: 125–170 psig, 965–1275 kPa), and with a relative humidity of approximately 28% (range: 18–40%) was fed to a packed bed of macroporous polymeric adsorbent in stainless steel tubing 12 inches (30.5 cm) in length and standard ½-inch diameter (internal diameter 0.44 inch, 1.12 cm). Air leaving the packed bed entered a particle filter and then a laboratory fiber membrane unit containing about 100 fibers of 2,2-bis(3,5-bromo-4-hydroxyphenyl)propane polycarbonate, each of approximately 12 to 18 inches in length. Flow and pressure meters were installed on both the inlet and outlet of the fiber membrane unit.

Two macroporous polymeric adsorbents were tested in separate experiments, while in still further experiments, the adsorbent was replaced by four types of granular activated carbon. The two polymeric adsorbents were DOWEX® OPTIPORE ® V493 and V502, products of The Dow Chemical Company, Midland, Mich., USA, both described as methylene bridged copolymers of styrene and divinylbenzene with the following properties (quoted by the supplier):

TABLE I

Polymeric Adsorbents

| | V493 | V502 |
|---|---|---|
| Particle Size | 20–50 Mesh | 1.5 mm |
| BET Surface Area ($m^2/g$) | 1100 | 1080 |
| Total Porosity (cc/g) | 1.16 | 0.94 |
| Average Pore Diameter (Å) | 46 | 34 |
| Apparent Density (g/cc) | 0.34 | 0.4 |
| Crush Strength (g/bead) | >500 | >1000 |

The activated carbons were Calgon Xtrasorb 700, Calgon Centaur, and Calgon BPL 4X6 coconut, all from Calgon Carbon Corporation, Catlettsburg, Ky., USA, and Pittsburgh, Pa., USA; and Barneby Sutcliffe 208C from Barneby and Sutcliffe, Columbus, Ohio, USA.

The flow rate through the adsorbent bed was selected to provide the compressed air with a residence time of 1.0 second and a space velocity of 1 foot per second (30.5 cm/sec). The change in flux, alpha (separation factor), and pressure drop (ΔP) across the membrane module were measured as a function of time.

The results are shown in Tables II, III, IV, V, and VI below. These results show that both polymeric adsorbents caused less than a 4% drop in flux and slightly over a 3% increase in alpha over a period of twelve months. This compares with the activated carbons, each of which caused more than an 8% drop in flux and (with the exception of Calgon Xtrasorb) an increase in alpha of 5–9%.

TABLE II

Membrane Module Performance Over Time Using Upstream Polymeric Adsorbents

| | Using V493 Adsorbent: Measurements on Membrane | | | Using V502 Adsorbent: Measurement on Membrane | | |
|---|---|---|---|---|---|---|
| Hours | Flux[a] | Alpha[b] | ΔP[c] | Flux[a] | Alpha[b] | ΔP[c] |
| 0.0 | 20.98 | 7.19 | 0.00 | 20.98 | 7.19 | 0.00 |
| 326.5 | 19.95 | 7.11 | 5.00 | 20.44 | 7.17 | 0.50 |
| 492.7 | 20.27 | 7.03 | 3.60 | 20.39 | 7.19 | 0.50 |
| 636.9 | 26.03 | 7.12 | 2.50 | 19.45 | 7.24 | 0.40 |
| 830.9 | 19.88 | 7.15 | 3.00 | 19.73 | 7.30 | 0.50 |
| 991.4 | 19.97 | 7.15 | 2.80 | 19.77 | 7.26 | 0.30 |
| 1164.4 | 19.14 | 7.25 | 2.30 | 19.22 | 7.40 | 0.50 |
| 1333.4 | 20.09 | 7.12 | 2.70 | 20.02 | 7.26 | 0.50 |
| 1501.4 | 19.96 | 7.12 | 2.50 | 19.95 | 7.24 | 0.40 |
| 1645.4 | 20.00 | 7.09 | 2.20 | 20.09 | 7.25 | 0.30 |
| 1837.4 | 20.17 | 7.08 | 2.20 | 20.12 | 7.21 | 0.40 |
| 2005.4 | 19.54 | 7.21 | 2.60 | 19.49 | 7.27 | 0.40 |
| 2173.4 | 20.13 | 7.01 | 2.10 | 20.09 | 7.14 | 0.30 |
| 2317.4 | 20.43 | 6.98 | | 20.29 | 7.05 | |
| 2509.4 | 19.41 | 7.15 | 2.00 | 19.31 | 7.25 | 0.30 |

TABLE II-continued

Membrane Module Performance Over Time Using Upstream Polymeric Adsorbents

| | Using V493 Adsorbent: Measurements on Membrane | | | Using V502 Adsorbent: Measurement on Membrane | | |
|---|---|---|---|---|---|---|
| Hours | Flux[a] | Alpha[b] | ΔP[c] | Flux[a] | Alpha[b] | ΔP[c] |
| 2677.4 | 20.13 | 6.94 | | 20.20 | 7.08 | 0.20 |
| 2845.4 | 20.18 | 6.92 | 2.20 | 20.28 | 7.08 | 0.40 |
| 3013.4 | 20.22 | 6.98 | | 20.17 | 6.87 | |
| 3181.4 | 19.53 | 7.10 | | 19.56 | 7.17 | |
| 3349.4 | 19.96 | 7.13 | | 19.89 | 7.28 | |
| 3517.4 | 20.15 | 6.97 | | 19.96 | 7.03 | |
| 4021.4 | 20.37 | 6.87 | | 18.92 | 6.97 | |
| 4189.4 | 20.24 | 6.97 | 1.90 | 20.26 | 7.17 | 0.20 |
| 4357.4 | 20.95 | 6.83 | 3.70 | 20.95 | 6.93 | 0.30 |
| 4693.4 | 20.52 | 7.83 | 7.00 | 20.50 | 6.94 | 0.20 |
| 4861.4 | 20.06 | 6.97 | 1.90 | 20.05 | 7.14 | 0.20 |
| 5029.4 | 20.04 | 7.14 | 4.20 | 19.94 | 7.17 | 0.20 |
| 5533.4 | 19.76 | 7.04 | 2.40 | 19.67 | 7.11 | 0.30 |
| 5701.4 | 20.87 | 6.98 | 3.90 | 20.81 | 7.06 | 0.30 |
| 5869.4 | 20.05 | | 3.30 | 20.02 | | 0.30 |
| 6037.4 | 20.64 | 7.19 | 4.30 | 20.56 | 7.31 | |
| 6709.4 | 20.21 | 7.30 | 6.50 | 20.13 | 7.42 | |
| 6877.4 | 17.25 | 7.53 | | 20.03 | 7.35 | |
| 7021.4 | 20.05 | 7.37 | | 20.09 | 7.47 | |
| 7885.4 | 19.85 | 7.15 | | 19.63 | 7.46 | |
| 8413.4 | 20.18 | 7.43 | | 20.15 | 7.54 | |
| 8653.4 | 20.40 | 7.20 | | 20.34 | 7.37 | |
| Last Month Average: | 19.54 | 7.34 | | 20.09 | 7.44 | |
| First Month Average: | 20.27 | 7.12 | | 20.39 | 7.21 | |
| Percent: Average: | -3.59% | +3.04% | | -1.46% | +3.11% | |

(a) Units: $10^{-6}$ sec/$cm^2$-(cm Hg)-sec
(b) Dimensionless
(c) Units: inches of water (multiply by 1.87 to convert to mm of Hg and by 0.249 to convert to kilopascals)

TABLE III

Membrane Performance Using CALGON Xtrasorb 700 Activated Carbon

| | Membrane Performance | | |
|---|---|---|---|
| Hours | Flux[a] | Alpha[b] | ΔP[c] |
| 0 | 17.24 | 7.14 | 0 |
| 327 | 16.47 | 6.87 | 0 |
| 493 | 16.25 | 6.92 | 0 |
| 637 | 15.40 | 6.93 | 0 |
| 831 | 15.52 | 6.96 | 0 |
| 991 | 15.62 | 6.98 | 0 |
| 1164 | 15.19 | 7.05 | 0 |
| 1333 | 15.66 | 6.99 | 0 |
| 1501 | 15.31 | 6.98 | 0 |
| 1645 | 15.33 | 7.05 | 0 |
| 1837 | 15.32 | 7.32 | 0 |
| 2005 | 14.98 | 7.38 | 0 |
| 2173 | 15.33 | 7.30 | 0 |
| 2317 | 15.59 | 7.15 | |
| 2509 | 14.56 | 7.42 | 0 |
| 2677 | 15.24 | 7.35 | |
| 2845 | 15.16 | 7.30 | 0 |
| Change Over Test Duration | -12.06% | +2.24% | |

(a) Units: $10^{-6}$ sec/$cm^2$ -(cm Hg)-sec
(b) Dimensionless
(c) Units: inches of water (multiply by 1.87 to convert to mm of Hg and by 0.249 to convert to kilopascals)

TABLE IV

Membrane Performance Using CALGON CENTAUR Activated Carbon

| | Membrane Performance | | |
|---|---|---|---|
| Hours | Flux$^{(a)}$ | Alpha$^{(b)}$ | $\Delta P^{(c)}$ |
| 0 | 17.24 | 7.14 | 0 |
| 327 | 15.24 | 7.51 | 0 |
| 493 | 15.39 | 7.48 | 0 |
| 637 | 14.93 | 7.45 | 0 |
| 831 | 15.18 | 7.48 | 0 |
| 991 | 15.19 | 7.57 | 0 |
| 1164 | 14.82 | 7.59 | 0 |
| 1333 | 15.34 | 7.81 | 0 |
| 1501 | 15.46 | 7.3 | 0 |
| 1645 | 15.55 | 7.97 | 0.1 |
| 1837 | 15.67 | 7.67 | 0 |
| 2005 | 15.18 | 7.74 | 0.1 |
| 2173 | 15.58 | 8 | 0 |
| 2317 | 15.83 | 7.9 | |
| 2509 | 14.86 | 7.94 | 0.1 |
| 2677 | 15.62 | 8 | |
| 2845 | 15.71 | 7.64 | 0 |
| Change Over Test Duration | −8.93% | +7.00% | |

(a) Units: $10^{-6}$ sec/cm$^2$ -(cm Hg)-sec
(b) Dimensionless
(c) Units: inches of water (multiply by 1.87 to convert to mm of Hg and by 0.249 to convert to kilopascals)

TABLE V

Membrane Performance Using CALGON BPL 4 × 6 Activated Carbon

| | Membrane Performance | | |
|---|---|---|---|
| Hours | Flux$^{(a)}$ | Alpha$^{(b)}$ | $\Delta P^{(c)}$ |
| 0 | 20.98 | 7.19 | 0 |
| 327 | 14.73 | 7.57 | 0 |
| 493 | 15.21 | 7.52 | 0.1 |
| 637 | 14.60 | 7.64 | 0.1 |
| 831 | 14.93 | 7.53 | 0 |
| 991 | 14.83 | 7.49 | 0.1 |
| 1164 | 14.65 | 7.57 | 0 |
| 1333 | 15.19 | 7.72 | 0.1 |
| 1501 | 15.34 | 7.66 | 0.1 |
| 1645 | 15.43 | 7.79 | 0.1 |
| 1837 | 15.42 | 7.78 | 0.1 |
| 2005 | 15.18 | 7.74 | 0.1 |
| 2173 | 15.45 | 7.82 | 0.1 |
| 2317 | 15.60 | 7.67 | 0.1 |
| 2509 | 14.58 | 7.89 | 0.1 |
| 2677 | 15.40 | 7.9 | 0.1 |
| 2845 | 15.33 | 7.83 | 0.1 |
| Change Over Test Duration | −26.93% | +8.90% | |

(a) Units: $10^{-6}$ sec/cm$^2$ -(cm Hg)-sec
(b) Dimensionless
(c) Units: inches of water (multiply by 1.87 to convert to mm of Hg and by 0.249 to convert to kilopascals)

TABLE VI

Membrane Performance Using Barneby Sutcliff 208C Activated Carbon

| | Membrane Performance | | |
|---|---|---|---|
| Hours | Flux$^{(a)}$ | Alpha$^{(b)}$ | $\Delta P^{(c)}$ |
| 0 | 17.24 | 7.14 | 0 |
| 327 | 17.34 | 7.24 | 0 |
| 493 | 17.35 | 6.95 | 0 |
| 637 | 16.90 | 7.11 | 0 |
| 831 | 17.12 | 6.99 | 0 |
| 991 | 17.01 | 7.02 | 0 |
| 1164 | 16.99 | 7.03 | 0 |
| 1333 | 16.83 | 7.01 | 0 |
| 1501 | 16.13 | 7.63 | 0 |
| 1645 | 16.84 | 6.95 | 0 |
| 1837 | 17.03 | 6.82 | 0 |
| 2005 | 15.84 | 7.5 | 0 |
| Change Over Test Duration | −8.12% | +5.04% | |

(a) Units: $10^{-6}$ sec/cm$^2$ -(cm Hg)-sec
(b) Dimensionless
(c) Units: inches of water (multiply by 1.87 to convert to mm of Hg and by 0.249 to convert to kilopascals)

The foregoing is offered primarily for purposes of illustration. It will be readily apparent to those skilled in the art that the flow schemes, operating conditions, materials, procedural steps and other parameters of the system described herein may be further modified or substituted in various ways without departing from the spirit and scope of the invention.

We claim:

1. A process for separating a gas mixture into components by permeation through a membrane, the process comprising:

a) compressing the gas mixture in oil-lubricated compression means to form an oil-mist-containing compressed gas stream;

b) directing the compressed gas stream through a heater;

c) passing the compressed gas stream, after it leaves the heater, through a macroporous polymeric adsorbent;

d) transferring heat from the compressed gas stream exiting the macroporous polymeric adsorbent to the compressed gas stream before said compressed gas stream enters the heater; and e) passing the substantially oil-free compressed gas stream, exiting the macroporous polymeric adsorbent, through a gas separation membrane system.

2. The process of claim 1, wherein step (b) is preceded by the step of passing the compressed gas stream through one path of a cross heat exchanger, and wherein step (d) comprises passing the compressed gas stream exiting the macroporous polymeric adsorbent through another path of the cross heat exchanger.

3. The process of claim 2, further comprising the step of removing excess moisture from the compressed gas stream before passing the compressed gas stream through said one path of the cross heat exchanger.

4. The process of claim 1, wherein the compressed gas stream is passed through at least one filter before entering the macroporous polymeric adsorbent.

5. The process of claim 1, wherein the oil mist in the cinorssed gas stream contains oil having a molecular weight of at least about 300.

6. In a process for separating a gas mixture into components by permeation through a membrane, the process comprising compressing the gas mixture in oil-lubricated compression means to form an oil-mist-containing compressed gas stream, and passing the compressed gas stream through a gas separation membrane system, the improvement comprising:
- a) heating the compressed gas stream in a heating means and then passing the heated compressed gas stream through a macroporous polymeric adsorbent, before said compressed gas stream reaches the gas separation membrane system, and
- b) transferring heat from the compressed gas stream, which has passed through the macroporous polymeric adsorbent, to the compressed gas stream which has not yet reached the heating means.

7. The improvement of claim 6, wherein the heat transferring step is performed by passing an upstream portion of the compressed gas stream and a downstream portion of the compressed gas stream through a cross heat exchanger.

8. The improvement of claim 7, further comprising the step of removing excess moisture from the compressed gas stream before passing the compressed gas stream into the cross heat exchanger.

9. The improvement of claim 6, wherein the compressed gas stream is passed through at least one filter before entering the macroporous polymeric adsorbent.

10. The process of claim 6, wherein the oil mist in the compressed gas stream contains oil having a molecular weight of at least about 300.

11. Apparatus for separating a gas mixture into components by permeation through a membrane, comprising:
- a) an oil-lubricated compression means for compressing the gas mixture to form an oil-mist-containing compressed gas stream;
- b) a heater;
- c) a macroporous polymeric adsorbent;
- d) a cross heat exchanger;
- e) a gas separation membrane system;
- f) first conduit means for directing the compressed gas stream through the heat exchanger, then through the heater, and then through the macroporous polymeric adsorbent; and
- g) second conduit means for directing the compressed gas stream from the macroporous polymeric adsorbent, then through the heat exchanger, and then to the gas separation membrane system.

12. The apparatus of claim 11, further comprising at least one filter positioned to filter the compressed gas stream before the compressed gas stream enters the marcroporous polymeric adsorbent.

13. The apparatus of claim 11, further comprising means for removing excess moisture from the compressed gas stream before the compressed gas stream enters the cross heat exchanger.

14. The apparatus of claim 11, wherein the oil mist in the compressed gas stream contains oil having a molecular weight of at least about 300.

15. In an apparatus for separating a gas mixture into components by permeation through a membrane, the apparatus comprising oil-lubricated compression means for compressing the gas mixture to form an oil-mist-containing compressed gas stream, and a gas separation membrane system connected to receive gas compressed by the compression means, the improvement comprising:
- a) means for heating the compressed gas stream before said stream enters the macroporous polymeric adsorbent; and
- b) means for transferring heat from the compressed gas stream exiting the macroporous polymeric adsorbent to an upstream portion of the compressed gas stream that has not yet reached the heating means.

16. The improvement of claim 15, wherein the transferring means comprises a cross heat exchanger connected to pass the upstream portion and a downstream portion of the compressed gas stream.

17. The improvement of claim 16, further comprising means for removing excess moisture from the compressed gas stream before the compressed gas stream enters the cross heat exchanger.

18. The improvement of claim 15, further comprising means for filtering the compressed gas stream before it enters the macroporous polymeric adsorbent.

19. The improvement of claim 15, wherein the oil mist in the compressed gas stream contains oil having a molecular weight of at least about 300.

* * * * *